(12) United States Patent
Baumhoff et al.

(10) Patent No.: US 7,748,749 B2
(45) Date of Patent: Jul. 6, 2010

(54) DECOUPLING ELEMENT IMPERVIOUS TO LIQUID FLUIDS

(75) Inventors: Dietmar Baumhoff, Siegen (DE); Frank Bender, Drolshagen (DE); Karl-Heinz Münker, Hilchenbach (DE); Stefan Hauk, Hilchenbach (DE); Matthias Weiss, Hilchenbach (DE)

(73) Assignee: Westfalia Metallschlauchtechnik GmbH & Co. KG, Hilchenbach (DE)

( * ) Notice: Subject to any disclaimer, the term of this patent is extended or adjusted under 35 U.S.C. 154(b) by 640 days.

(21) Appl. No.: 11/548,106

(22) Filed: Oct. 10, 2006

(65) Prior Publication Data
US 2007/0132232 A1 Jun. 14, 2007

Related U.S. Application Data

(60) Provisional application No. 60/724,413, filed on Oct. 7, 2005.

(51) Int. Cl.
*F16L 11/12* (2006.01)
(52) U.S. Cl. ............... 285/49; 285/145.5; 285/226; 138/121
(58) Field of Classification Search ............ 285/144.1, 285/145.4, 145.5, 148.3, 223, 226, 227, 228, 285/235, 236, 237, 298, 299, 300, 301, 302, 285/49; 138/106, 109, 114, 121, 129, 154; 403/50, 51
See application file for complete search history.

(56) References Cited

U.S. PATENT DOCUMENTS

| 2,506,293 | A | * | 5/1950 | Copeland | 285/96 |
| 3,204,666 | A | * | 9/1965 | Lindsay et al. | 138/135 |
| 3,240,234 | A | * | 3/1966 | Bond et al. | 138/129 |
| 3,549,176 | A | * | 12/1970 | Contreras | 285/55 |
| 3,574,361 | A | * | 4/1971 | Contreras et al. | 285/226 |
| 5,222,288 | A | * | 6/1993 | Thomas | 29/514 |
| 5,901,754 | A | * | 5/1999 | Elsasser et al. | 138/118 |
| 5,957,163 | A | * | 9/1999 | Ito et al. | 138/109 |
| 5,971,439 | A | * | 10/1999 | Cwik | 285/49 |
| 6,062,266 | A | * | 5/2000 | Burkhardt | 138/114 |
| 6,116,287 | A | * | 9/2000 | Gropp et al. | 138/114 |
| 6,296,282 | B1 | * | 10/2001 | Burkhardt et al. | 285/49 |
| 6,354,332 | B1 | * | 3/2002 | Burkhardt et al. | 138/109 |
| 6,488,313 | B1 | * | 12/2002 | Thomas | 285/49 |
| 6,513,552 | B1 | * | 2/2003 | Shepherd | 138/109 |

(Continued)

FOREIGN PATENT DOCUMENTS

CH 428 348 7/1967

(Continued)

*Primary Examiner*—James M Hewitt
*Assistant Examiner*—Jay R Ripley
(74) *Attorney, Agent, or Firm*—Henry M. Feiereisen; Ursula B. Day (57) ABSTRACT

For connection of pipelines which are subject to vibration, for example pipelines in vehicle exhaust systems, a liquid-tight decoupling element is used which includes a, e.g. multi-layer wound, metal hose and a tube accommodated in coaxial relationship inside or outside of the metal hose. A first axial fitting firmly secures one end of the tube. The tube is sized to protrude into a second axial fitting, regardless whether the metal hose is completely compressed or completely stretched, to allow movement of the tube in axial and torsional directions in relation to the second axial fitting.

14 Claims, 7 Drawing Sheets

U.S. PATENT DOCUMENTS

| | | | |
|---|---|---|---|
| 6,612,342 B2 * | 9/2003 | Godel et al. | 138/118 |
| 6,848,478 B2 * | 2/2005 | Nagai | 138/112 |
| 6,902,203 B2 * | 6/2005 | Kang | 285/226 |
| 7,451,785 B2 * | 11/2008 | Taira et al. | 138/118 |
| 2003/0047941 A1 * | 3/2003 | Thomas et al. | 285/226 |

FOREIGN PATENT DOCUMENTS

| | | |
|---|---|---|
| DE | 34 41 064 C2 | 5/1986 |
| DE | 38 04 105 C1 | 3/1989 |
| DE | 198 20 863 A1 | 11/1999 |
| DE | 101 13 180 C | 10/2002 |
| DE | 203 02 657 U | 10/2003 |
| GB | 2113336 A * | 8/1983 |
| WO | WO 2004059140 A1 * | 7/2004 |

* cited by examiner

DECOUPLING ELEMENT IMPERVIOUS TO LIQUID FLUIDS

CROSS-REFERENCES TO RELATED APPLICATIONS

This application claims the benefit of prior filed U.S. provisional Application No. 60/724,413, filed Oct. 7, 2005, pursuant to 35 U.S.C. 119(e), the disclosure of which is hereby incorporated herein by reference.

BACKGROUND OF THE INVENTION

The present invention relates to a decoupling element for pipelines subject to vibration. A typical example of an application would be in vehicle exhaust systems.

Nothing in the following discussion of the state of the art is to be construed as an admission of prior art.

Such devices are intended to connect in a flexible way pipes which are subject to vibration, and to protect them from vibration. In order to meet the requirements of the automotive industry (passenger cars) for gas-tightness, a metal bellows is often a module of such decoupling elements. As the large variations in diameter in the corrugations of the metal bellows may lead to turbulence, a metal hose is usually incorporated into the pipe so as to ensure laminar gas flow. It must be ensured that any noise generated during operation resulting from the metal hose hitting the inside of the bellows is kept to a minimum. This is often achieved by surrounding the hose with braiding. German Offenlegungsschrift DE 198 20 863 A 1 shows a flexible pipe as an example. Instead of using braiding, the metal hose and the metal bellows are connected at defined points so as to prevent the development of the type of noise described above.

For commercial vehicles, multi-layer wound metal hoses produced from profiled strip material are frequently used as decoupling element in exhaust systems. Since a low degree of leakage is permissible, it is not necessary to use a gas-tight element such as a metal bellows. A simple example of metal hoses used as decoupling elements is the so-called Agraff hose. Further examples, which have a longer service life and a lower leakage rate than Agraff hoses, have been described in German publications DE 34 41 064 C2 and DE 101 13 180 C2.

Wound metal hoses are especially suitable for the exhaust systems of commercial vehicles as they tolerate large offsets in the axial, lateral, and above all the torsional direction without structural tension arising. Their disadvantage, however, is the residual leakage.

As legal provisions worldwide will be stipulating a substantially reduced emission of pollutants from commercial vehicles, exhaust systems will increasingly be fitted with exhaust gas treatment modules such as soot filters and SCR systems. SCR systems in particular place new technical requirements on decoupling elements as they reduce nitrogen oxide in exhaust gas by adding AdBlue (=urea). AdBlue is injected into the exhaust gas flow. Depending on the service and ambient conditions, condensate may be formed on the inside walls of the exhaust system. Liquid urea has a good seepage ability and must not emerge from the exhaust system into the environment. For this reason, all pipes used in the exhaust system and in particular decoupling elements must be at least liquid-tight.

It would therefore be desirable and advantageous to provide an improved liquid-tight decoupling element to obviate prior art shortcomings and to prevent any penetration of condensate urea into the environment so as to be usable in exhaust systems in connection with SCR systems, while still allowing substantial movements in axial and in particular torsional direction.

SUMMARY OF THE INVENTION

According to one aspect of the present invention, a liquid-tight decoupling element includes a metal hose, a tube accommodated in coaxial relationship to the metal hose, a first axial fitting for firm connection of one end of the tube, and a second axial fitting for radially securing another end of the tube to allow movement of the tube in axial and torsional directions.

According to another feature of the present invention, the tube may be accommodated in coaxial relationship within or outside the metal hose.

According to another feature of the present invention, the tube may be sized to protrude in the second axial fitting, regardless whether the metal hose is completely compressed or completely stretched.

According to another feature of the present invention, an annular element may be provided for radially securing the tube to the second axial fitting. The tube may hereby be movably mounted in the second axial fitting by the annular element, regardless whether the metal hose is completely compressed or completely stretched.

According to another feature of the present invention, the tube may be made of metallic material with a defined mechanical feature and a defined chemical composition. As an alternative, the tube may also be made of elastomer, glass fiber reinforced material, silicate fiber reinforced material, ceramic material, compound material, or composite material. Likewise the annular element may be made of metallic material with a defined mechanical feature and a defined chemical composition, or of elastomer, glass fiber reinforced material, silicate fiber reinforced material, ceramic material, compound material, or composite material.

According to another feature of the present invention, the tube may be rigid with a high stiffness.

According to another feature of the present invention, the tube may be flexible.

According to another feature of the present invention, the tube may have a bellows-type geometry to define corrugations extending in two planes oriented perpendicular to one another in orthogonal relationship to a rotation axis, or with corrugations which extend helically about a perimeter of the tube.

According to another feature of the present invention, the tube and the metal hose may demarcate a cylindrical cavity therebetween for receiving a dampening element to effectively prevent metallic contact between the tube and the metal hose and resultant noise generation when vibrating. Suitably, the dampening element is a metal braiding.

When using a liquid-tight decoupling element according to the present invention in an exhaust system of a motor vehicle, the second axial fitting may have a circumferential cavity in the form of a bead to collect liquid contained in the exhaust system. The circumferential cavity prevents hereby a migration of liquid past the annular element to an area of the metal hose, especially when the decoupling element is installed horizontally.

According to another feature of the present invention, the tube may be a multi-layer wound corrugated tube.

According to another feature of the present invention, the tube may be a corrugated tube produced by partial expansion of a tube.

According to another feature of the present invention, the tube may be a metal bellows.

According to another feature of the present invention, the metal hose may be a multi-layer wound metal hose.

According to another feature of the present invention, the metal hose may be connected to the axial fittings.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
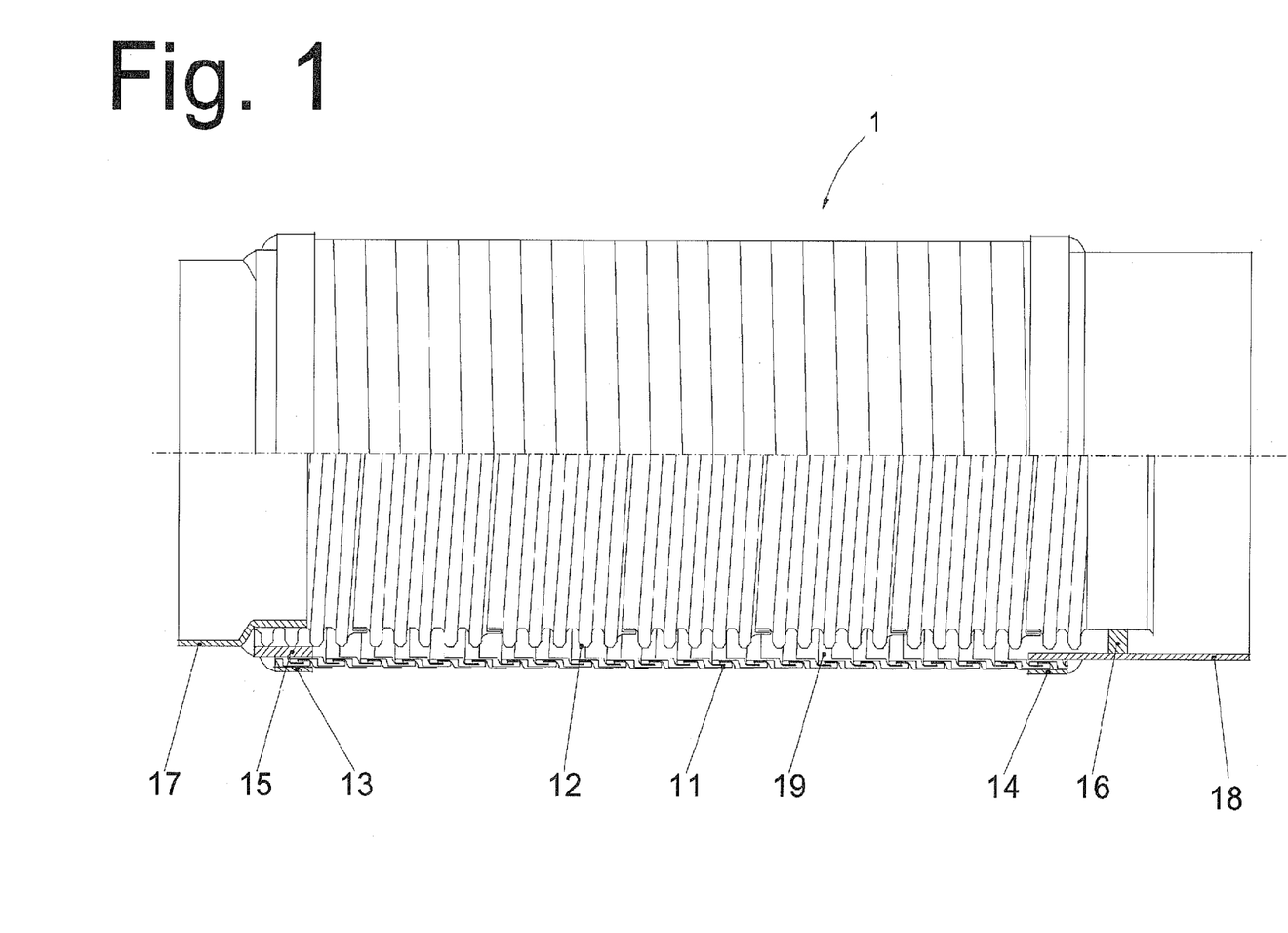
FIG. 1 is a schematic illustration of one embodiment of a decoupling element according to the present invention.
Figure 4:
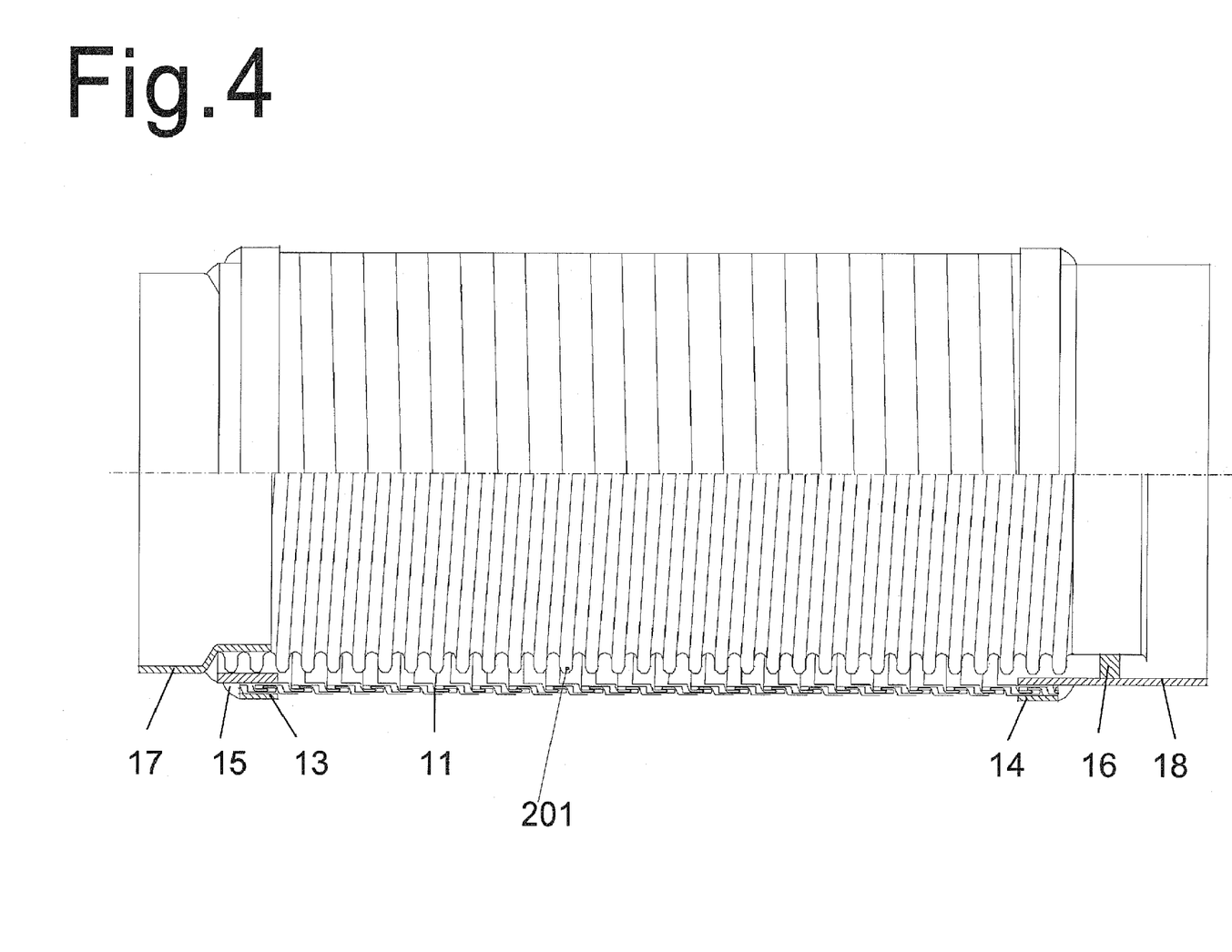
FIG. 4 is a schematic illustration of another modification of the decoupling element of FIG. 1.
Figure 6:
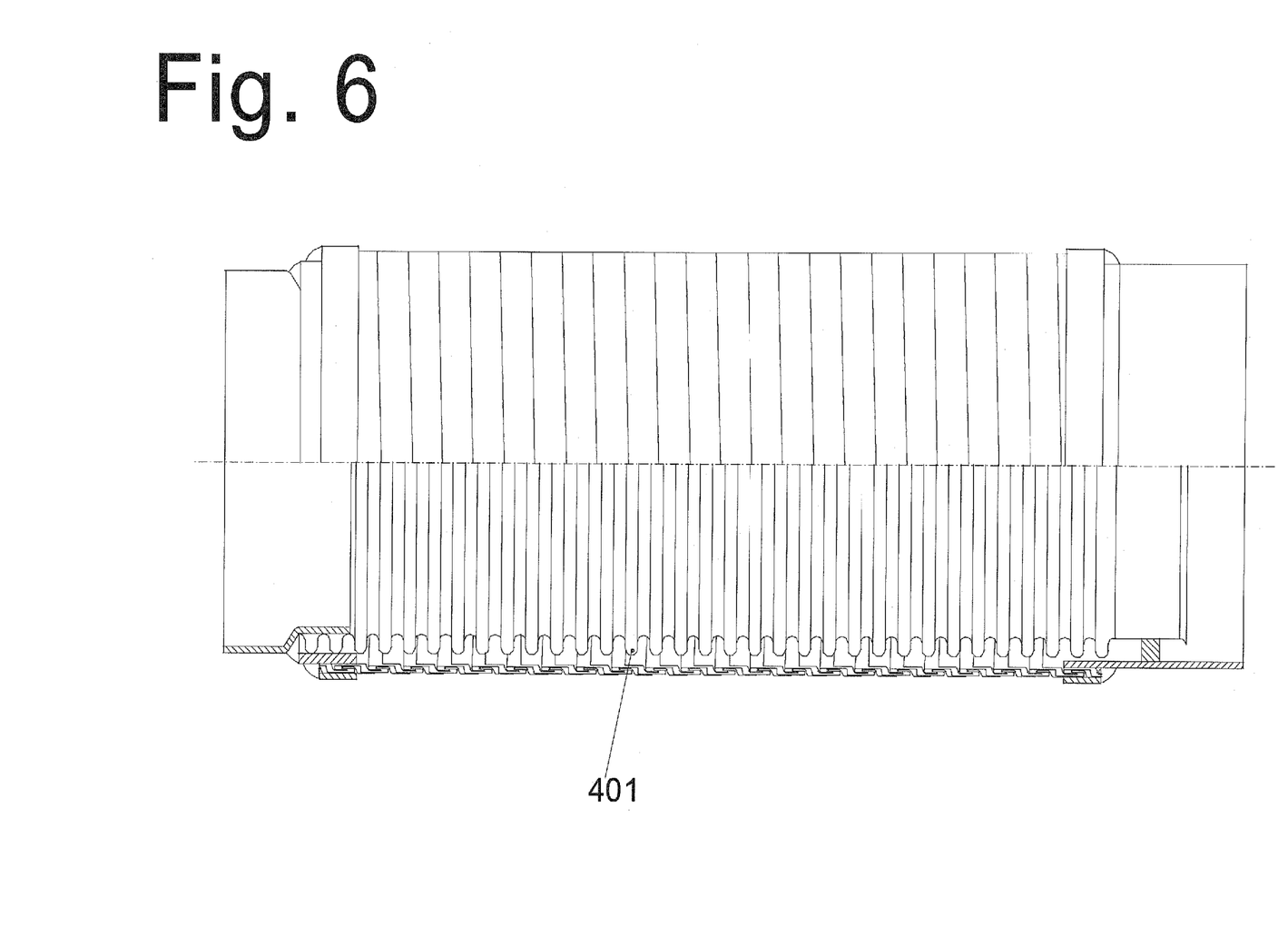
FIG. 6 is a schematic illustration of still another embodiment of a decoupling element according to the present invention.
Figure 7:
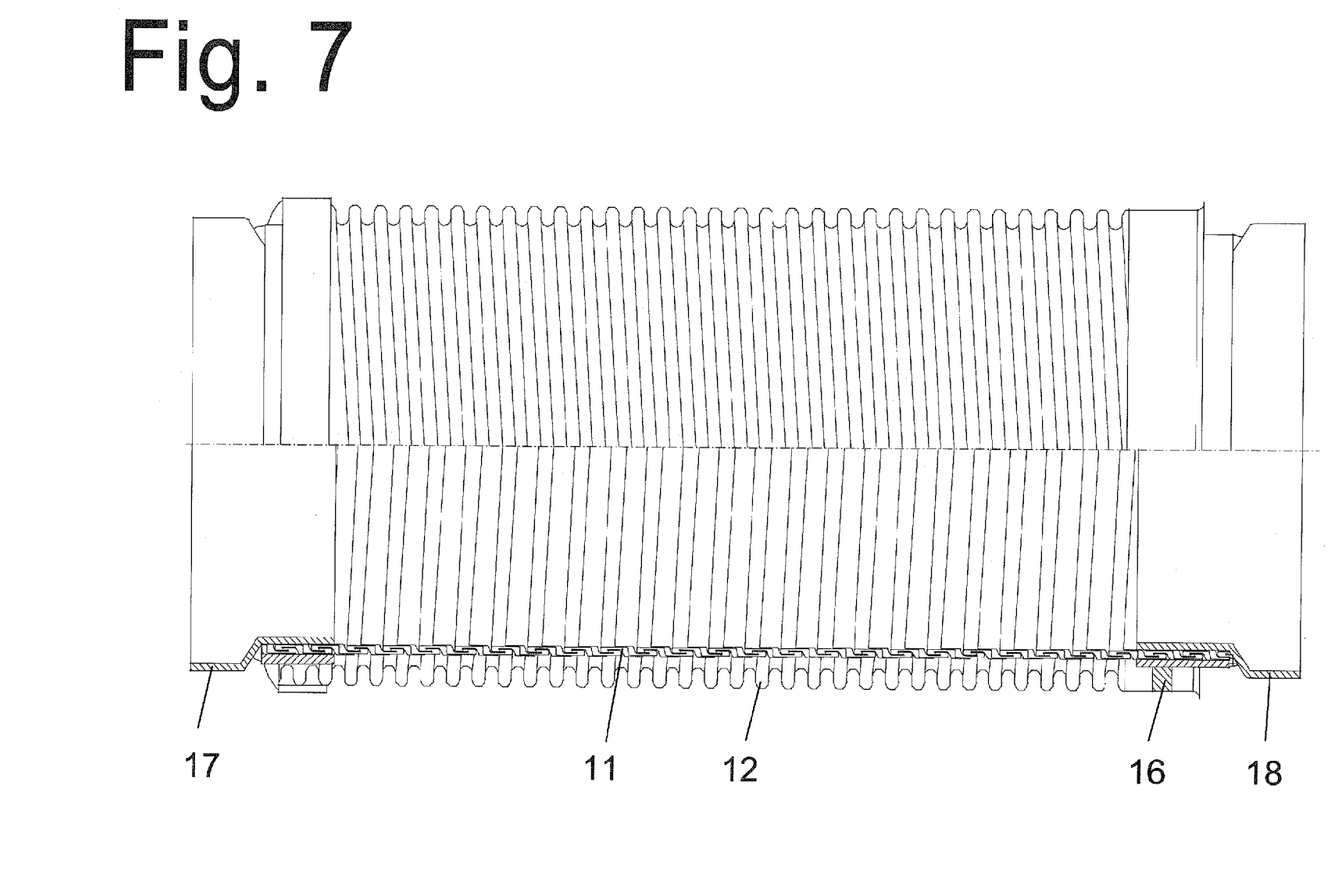
FIG. 7 is a schematic illustration of yet another embodiment of a decoupling element according to the present invention.

Turning now to the drawing, and in particular to FIG. 1, there is shown a schematic illustration of one embodiment of a decoupling element according to the present invention, generally designated by reference numeral 1. The decoupling element 1 includes a wound hose 11 which is produced by thread-type multi-layer winding of profiled metallic strip material. Accommodated in the wound hose 11 in coaxial relationship is a flexible metal tube 12 which is firmly connected on a left-hand side with an axial fitting 17 by a material union or in a form-fitting manner. As an alternative, as shown in FIG. 7, the tube 12 is accommodated in coaxial relationship outside the metal hose 11. The metal tube 12 may, e.g. be realized in the form of a multi-layer wound corrugated tube, a corrugated tube 401 shown in FIG. 6 and produced by partially expanding a tube, or a metal bellows 201, as shown by way of example in FIG. 4. Although the flexible tube 12 is described here as being made of a metal material, it is also possible to make the flexible tube of elastomer, glass fiber reinforced material, silicate fiber reinforced material, ceramic material, compound material, or composite material.

Figure 5:
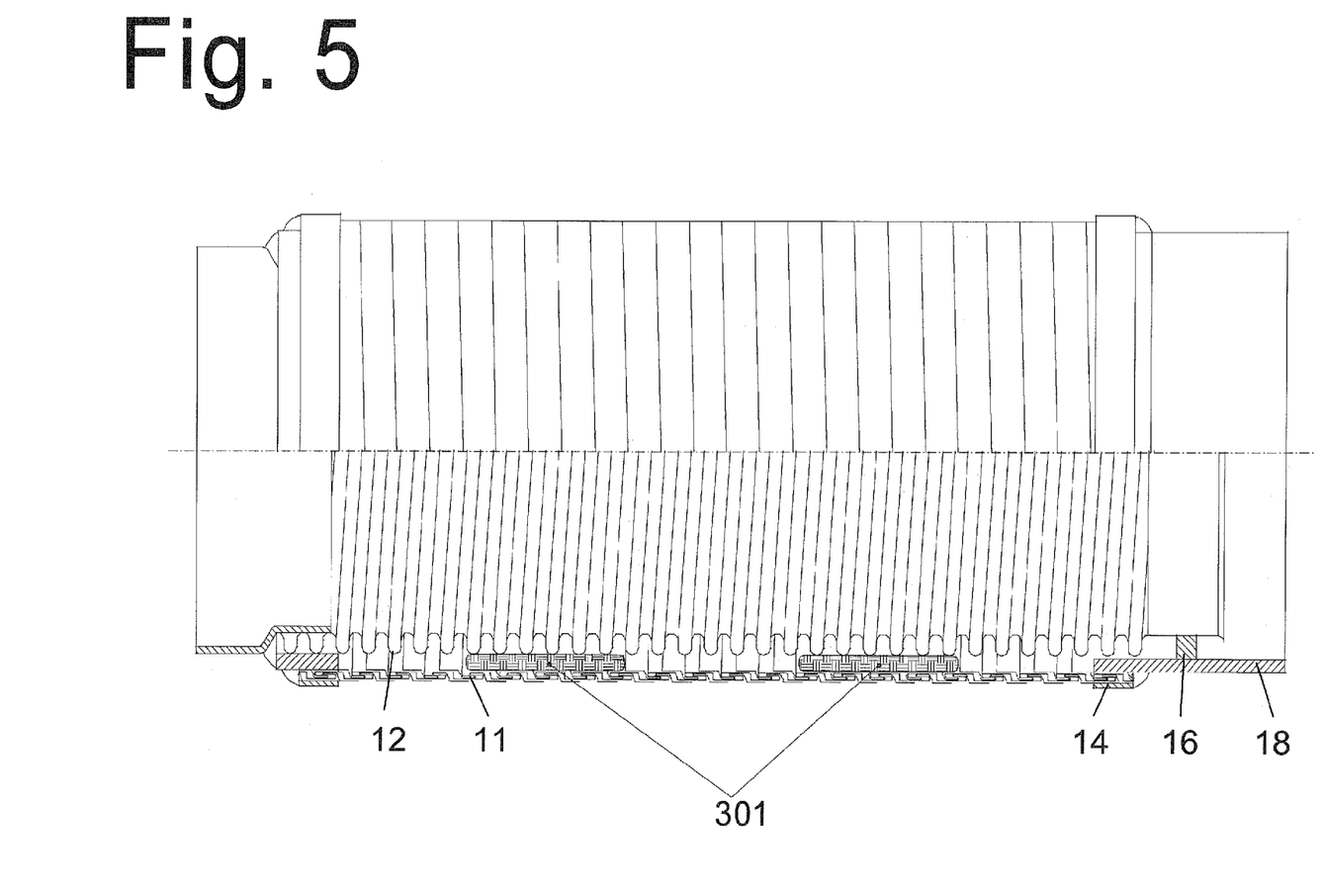
FIG. 5 is a schematic illustration of yet another embodiment of a decoupling element according to the present invention.

A sleeve 15 is fitted between an outside diameter of the flexible metal tube 12 and an inside diameter of the wound hose 11 to define a cylindrical cavity 19 between the flexible metal tube 12 and the wound hose 11. A dampening element 301, as shown in FIG. 5, such as braiding, may be placed in the annular cavity 19 to effectively prevent metallic contact between the flexible metal tube 12 and the wound hose 11 and thus any noise generation when the decoupling element 1 vibrates. A sleeve 13 is placed over the left-hand end of the wound hose 11 and connected to the hose 11 by a material union or in a form-fitting manner.

On the right-hand side, the decoupling element 1 includes an axial fitting 18 by which the wound hose 11 is connected with a second sleeve 14 by a material union or in a form-fitting manner. For reasons of fatigue strength, the flexible tube 12 cannot be firmly connected with the fitting 18. Rather, an annular element 16 is used to realize an attachment which secures the flexible tube 12 radially in the fitting 18, while allowing the flexible tube 12 to move in axial and torsional directions. This ensures that the flexible tube 12 needs only to absorb lateral movements during operation. The absence of axial and torsional loads as a consequence of the design has a positive influence on the fatigue strength of the flexible tube 12. Care must be taken however that the annular element 16 is accommodated inside the right fitting 18, even when the wound hose 11 is fully stretched or extended.

Figure 3:
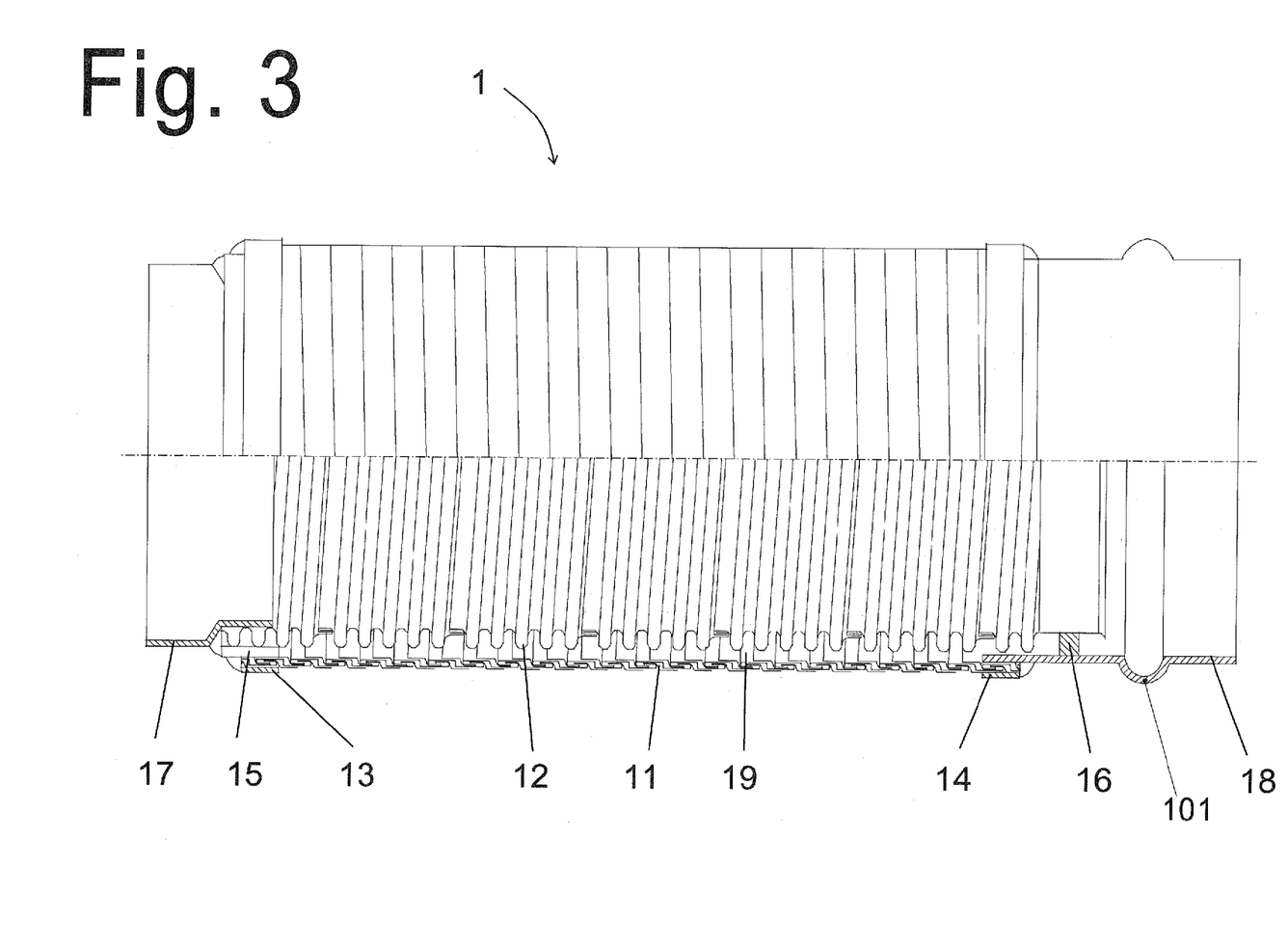
FIG. 3 is a schematic illustration of a modification of the decoupling element of FIG. 1.

As shown in FIG. 3, the fitting 18 may also be provided with a circumferential cavity 101 in the form of a bead to collect any liquid present in the exhaust system and to ensure, particularly when installed horizontally, that no liquid may pass the annular element 16 and migrate to the area of the wound hose 11 against the direction of flow.

The decoupling element 1 is liquid-tight when exhaust gas flows from the left fitting 17 to the right fitting 18. Any residual leakage refers solely to gas and is determined by the sealing effect of the annular element 16 and tightness of the wound hose 11. As different geometries of the wound hose 11 lead to different leakage rates, any residual leakage can be influenced through suitable construction of the wound hose 11 with lay-on profile, Agraff hoses or hose sections according to the afore-mentioned German publications DE 344 1064 C2 and DE 101 13 180 C2.

The decoupling element 1 is designed particularly for decoupling in the axial and torsional directions. Lateral flexibility is determined by the size of the cylindrical cavity 19 and lateral stiffness of the flexible tube 12. By varying these two elements, different designs are possible. For example, a decoupling element, which is intended exclusively for axial and torsional decoupling, may be provided with a very small cylindrical cavity 19 and a rigid tube 12. If greater lateral flexibility is required, the cylindrical cavity 19 must be sufficiently large, and the flexible tube 12 should have a low lateral stiffness.

Figure 2:
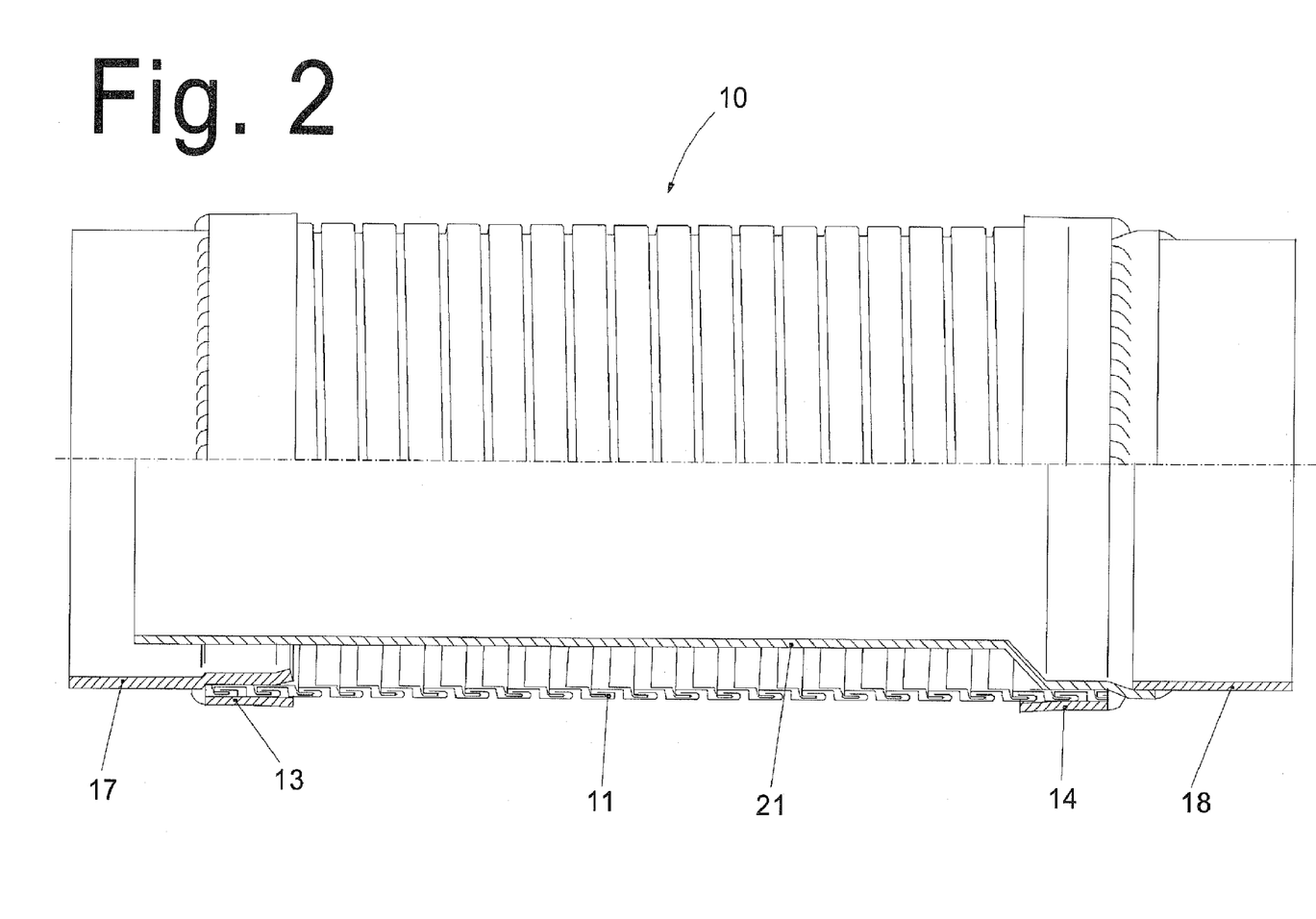
FIG. 2 is a schematic illustration of another embodiment of a decoupling element according to the present invention.

Referring now to FIG. 2, there is shown an alternative arrangement of a decoupling element, generally designated by reference numeral 10. Parts corresponding with those in FIG. 1 are denoted by identical reference numerals and not explained again. The description below will center on the differences between the embodiments. In this embodiment, provision is made for a tube 21 having a staggered diameter.

The annular element 16 can be made of pressed metal braiding. As an alternative, the annular element 16 may be made from ceramic, glass fiber reinforced material, silicate fiber reinforced material or composite material. These materials may also be used to fill the cylindrical cavity 19.

To suit a decoupling element according to the invention to a special application, combinations of the above designs are, of course, possible. In addition to its use in vehicle exhaust systems, the liquid-tight decoupling element described is also suitable for industrial applications such as the exhaust systems of stationary turbines.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A decoupling element, comprising:
   first and second axial fittings;
   a multi-layer spiral-wound metal hose pervious to gas and having terminal ends which are immovably connected to the first and second fittings, respectively, while allowing the metal hose to undergo a torsional movement;
   a tube in the form of a bellows accommodated in coaxial relationship to the metal hose and having one end immovably connected to one of the first and second fittings and another end radially secured to the other one of the first and second fittings without inhibiting a movement of the tube in axial and torsional directions; and
   an annular element radially securing the tube to the other one of the first and second axial fittings, wherein the tube is movably mounted in the other one of the first and second axial fittings by the annular element in such a way as to render the decoupling element effectively liquid-tight, pervious to gas, and capable to move in axial and torsional directions.

2. The decoupling element of claim 1, wherein the tube is accommodated in coaxial relationship within the metal hose.

3. The decoupling element of claim 1, wherein the tube is accommodated in coaxial relationship outside the metal hose.

4. The decoupling element of claim 1, wherein the tube is made of metallic material.

5. The decoupling element of claim 1, wherein the tube comprises a material selected from the group consisting of elastomer, glass fiber reinforced material, silicate fiber reinforced material, ceramic material, compound material, and composite material.

6. The decoupling element of claim 1, wherein the annular element is made of metallic material.

7. The decoupling element of claim 1, wherein the annular element comprises a material selected from the group consisting of elastomer, glass fiber reinforced material, silicate fiber reinforced material, ceramic material, compound material, and composite material.

8. The decoupling element of claim 1, wherein the tube in the form of a bellows defines corrugations extending in a plane oriented perpendicular to a rotation axis.

9. The decoupling element of claim 1, wherein the tube in the form of a bellows defines corrugations which extend helically about a perimeter of the tube.

10. The decoupling element of claim 1, wherein the tube and the metal hose demarcate a cylindrical cavity therebetween, and further comprising a dampening element provided in the cylindrical cavity to effectively prevent metallic contact between the tube and the metal hose and resultant noise generation when vibrating.

11. The decoupling element of claim 10, wherein the dampening element is a metal braiding.

12. The decoupling element of claim 1, wherein the other one of the first and second axial fittings has a circumferential cavity in the form of a bead to collect liquid.

13. The decoupling element of claim 12, wherein the circumferential cavity prevents a migration of liquid past the annular element to an area of the metal hose, when the decoupling element is installed horizontally.

14. The decoupling element of claim 1, wherein the tube is a metal bellows.

* * * * *